Figure 1:
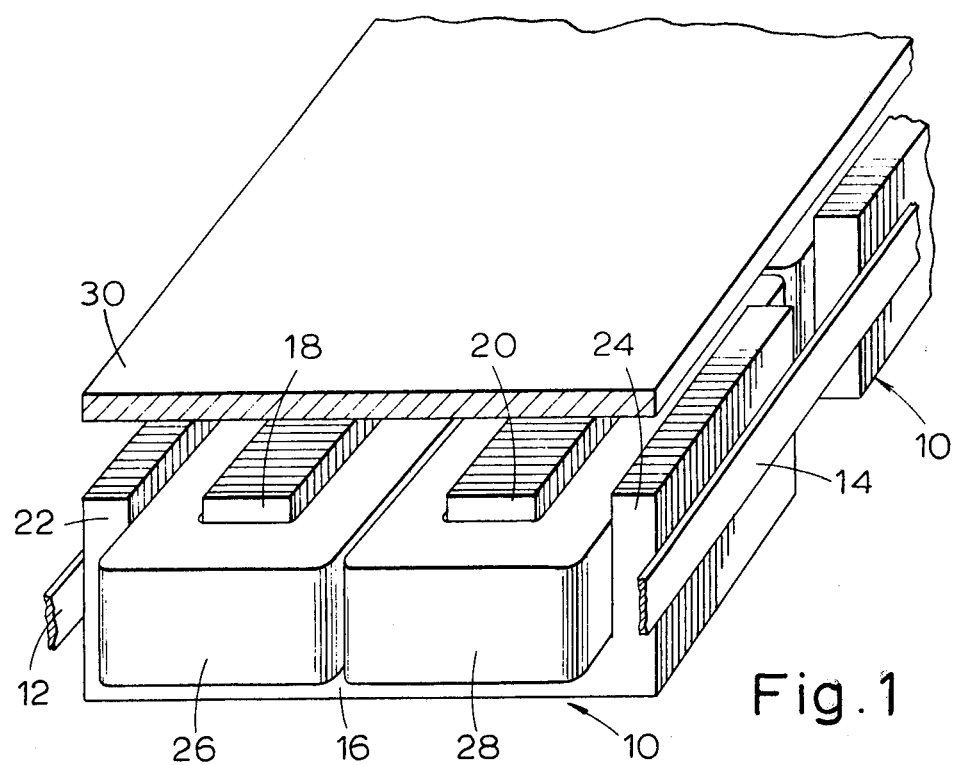

United States Patent [19]

Attwood et al.

[11] 4,049,983

[45] Sept. 20, 1977

[54] ELECTROMAGNETIC LEVITATION

[75] Inventors: Alan Attwood, Conwy, Wales; Eric Roberts Laithwaite, Long Ditton, England

[73] Assignee: National Research Development Corporation, London, England

[21] Appl. No.: 613,858

[22] Filed: Sept. 16, 1975

[30] Foreign Application Priority Data

Sept. 24, 1974 United Kingdom .............. 41421/74

[51] Int. Cl.² .............................................. H02K 41/02
[52] U.S. Cl. .................................. 310/13; 104/148 LM
[58] Field of Search ...................................... 310/12–19; 104/148, 148 LM

[56] References Cited

U.S. PATENT DOCUMENTS

| 3,610,972 | 10/1971 | Peleuc ........................... 310/13 |
| 3,644,762 | 2/1972 | Eastham ........................ 310/13 |
| 3,761,747 | 9/1973 | Allaigre ......................... 310/13 |
| 3,770,995 | 11/1973 | Eastham et al. .............. 310/13 |
| 3,836,799 | 9/1974 | Eastham et al. .............. 310/13 |
| Re. 28,161 | 9/1974 | Bolton et al. ................. 310/13 |

*Primary Examiner*—Donovan F. Duggan
*Attorney, Agent, or Firm*—Cameron, Kerkam, Sutton, Stowell & Stowell

[57] ABSTRACT

A primary member for a linear induction machine comprises a magnetic core having four parallel limbs with a respective pole face on each limb. Thus the core is similar to an E-core with an additional limb. Windings are preferably disposed only on the inner two limbs so that there are effectively no end windings, all windings coupling with the core.

7 Claims, 4 Drawing Figures

ELECTROMAGNETIC LEVITATION

This invention relates to electrical machines of the kind which provide electromagnetic levitation and propulsion.

Co-pending U.S. Pat. No. 3,836,799 discloses an electrical machine having a secondary member comprising electrically conductive material and a primary member comprising a core of magnetic material having at least two rows of pole faces confronting the secondary member with an air gap therebetween and polyphase energising windings so that, in use, one of the primary member and the secondary member is supported in a stable position above the other and propelled in the direction parallel to the rows of pole faces. The present invention is concerned with machines of this type.

According to the present invention, a primary member for a linear induction machine comprises a core of magnetic material having four longitudinally spaced sets of laterally adjacent co-planar pole faces, said core being arranged to provide paths for working flux between said pole faces in transverse planes substantially perpendicular to the plane containing said pole faces and having energising windings thereon.

Preferably each set of four laterally adjacent pole faces is formed on the ends of four limbs of a respective core portion, the core portion also including a backing part interconnecting the ends of the limbs remote from the pole faces. Thus the core is similar to an E-core but possesses an additional limb. If the windings are disposed only on the inner two limbs, there are effectively no end windings, all windings coupling with the core.

An electrical machine having a primary member in accordance with the invention, also has a secondary member comprising electrically conductive material disposed so that the pole faces confront one side thereof with a single air gap therebetween. The secondary member is arranged to produce longitudinal paths for electric currents on each side of at least the inner pole faces of each set and transverse paths for electric current interconnecting the longitudinal paths. In use, if the windings of the primary member are energised from an alternating current supply, the resulting field of magnetomotive force is operative to produce a thrust having first components tending to force said primary member and said secondary member either apart or together and second components tending to maintain said primary member and said secondary member in alignment one with another. If the windings are energised from a plural phase alternating current supply, the resulting field of magnetomotive force travels in the longitudinal direction so that the thrust has additional components tending to cause relative longitudinal displacement between said primary member and said secondary member.

The secondary member preferably comprises a sheet of electrically conductive non-magnetic material and includes magnetic material on the side of the sheet of electrically conductive material remote from the primary. In order to provide stable levitation when the above mentioned first components of thrust tend to force the primary member and the secondary member apart, it is important to ensure that no significant quantity of magnetic flux from the primary member can reach the secondary magnetic material without first having passed through the sheet of electrically conductive non-magnetic material. One way of arranging this is for the sheet of electrically conductive non-magnetic material to be at least as wide as the primary core and for the magnetic material of the secondary to be significantly narrower than the electrically conductive non-magnetic material. Another way is to bend the edges of the sheet of electrically conductive non-magnetic material around the side edges of the magnetic material so that the magnetic material, in the region of such edges, is enclosed in a generally U-shaped channel of electrically conductive non-magnetic material to provide shielding. Within the limits necessary to obtain stable levitation, variation of the width of the sheet of electrically conductive non-magnetic material and the width of the sheet of magnetic material has the effect of varying the proportions of lift force, thrust and lateral stabilising force.

In general, there is little advantage to be obtained in making the magnetic material of the secondary member wider than the core of the primary member. The sheet of electrically conductive non-magnetic material can advantageously be made wider in order to reduce the "end ring" resistance. However, there is a critical width beyond which the electrically conductive non-magnetic material of the secondary cannot be extended without impairing stability. The precise value of this width varies with the particular design of the primary member and increases as the height of the air gap between the primary member and the secondary member increases.

It has been found that, for machines above a critical size, the increase in lift obtained by the increased flux density at the secondary member due to the presence of the magnetic material thereof is much greater than the magnetic attraction between this magnetic material and the magnetic material of the primary member. Use of a primary member in accordance with the invention gives both greater lift force and greater lateral stability for the same current than has been obtained with previous machines. The absence of end windings due to the unwound outer limbs of the core of the primary member enables an increased power factor to be obtained.

Figure 2:
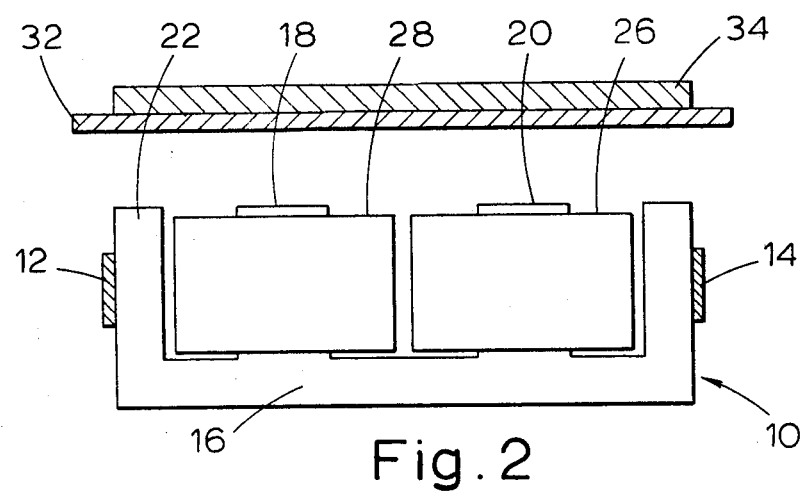
Figure 3:
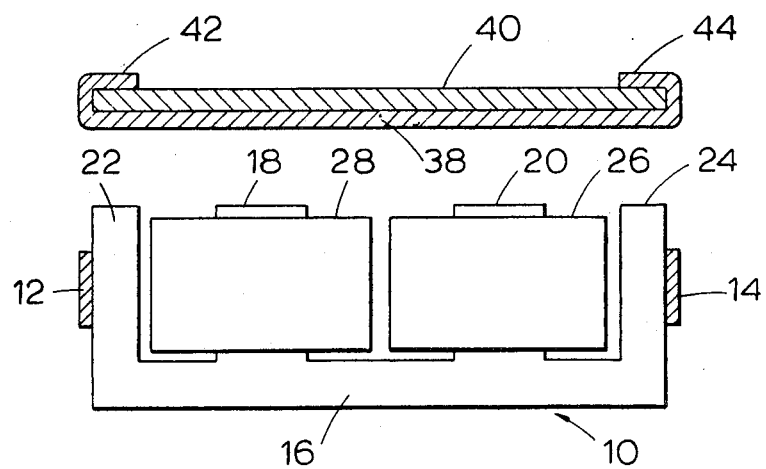
Figure 4:
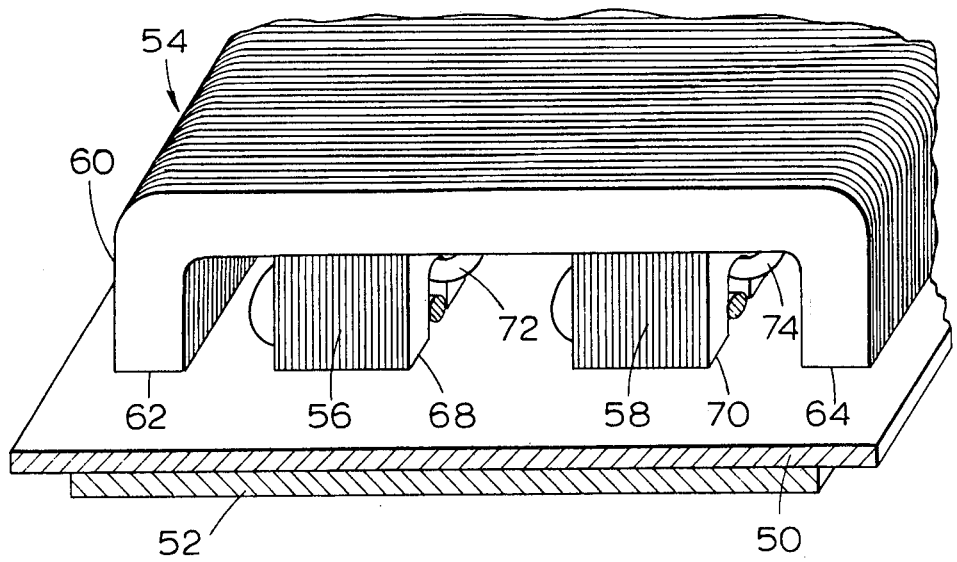

Embodiments of the invention will now be described, by way of example, with reference to the accompanying drawings in which:

FIG. 1 is a perspective view of an electrical machine in accordance with a first embodiment of the invention, FIG. 2 is a cross-sectional view of an electrical machine having a primary member as illustrated in FIG. 1 but a modified secondary member, FIG. 3 is a cross-sectional view of an electrical machine having a primary member as illustrated in FIGS. 1 and 2 and a yet further modified secondary member, and FIG. 4 is a perspective view of an electrical machine in accordance with another embodiment of the invention.

Referring first to FIG. 1, the primary member of a linear induction machine in accordance with the invention consists of a row of core portions 10 interconnected by structural members 12 and 14 which do not form part of the magnetic circuit of the machine.

Each of the core portions 10 is formed of a stack of mutually insulated laminations of magnetic material oriented transversely, that is, perpendicular to the structural members 12 and 14. Each core portion 10 consists of a backing part 16 interconnecting two inner limbs 18 and 20 and two outer limbs 22 and 24. Thus, the cross-section of the core is generally similar to that of an E-core machine but with an additional limb and is generally similar to the Greek letter Xi. Cores of this type will hereinafter be referred to as Xi-cores. The inner limbs 18 and 20 carry respective windings 26 and 28 which are so connected that the m.m.f. in the limb 18 is in the opposite direction to that in the limb 20.

Located above the primary member is a secondary member comprising a sheet 30 of electrically conductive non-magnetic material such as aluminum. The width of the sheet 30 is equal to the width of the core portions 10. In use, the windings 26 and 28 of successive core portions 10 can be energised from respective phases of a three phase alternating current supply so that a longitudinally travelling field of m.m.f. is produced. The field of m.m.f. supports the secondary member 30 above the primary sections 10 and maintains it in alignment therewith as well as propelling it longitudinally.

Referring to FIG. 2, the primary member is identical with the primary member of the embodiment shown in FIG. 1. The secondary member consists of a sheet 32 of aluminium or electrically conductive non-magnetic material, the width of which is greater than that of the primary core portions 10, and a sheet 34 of magnetic material disposed on the opposite side of the sheet 32 to the primary member. The width of the sheet 34 is equal to that of the core sections 10. Because the edges of the sheet 32 project beyond the sheet 34, substantially all the magnetic flux reaching the sheet 34 from the primary portions 10 first passes through the sheet 32. In addition, these projecting edge regions lower the end ring resistance of the secondary member.

The machine illustrated in FIG. 3 has a primary member identical with that of the embodiments illustrated in FIGS. 1 and 2. The secondary member consists of a sheet 38 of electrically conductive non-magnetic material such as aluminium backed by a sheet 40 of magnetic material. The sheet 40 has the same width as the primary core portions 10. The side edge regions 42 and 44 of the electrically conductive sheet 38 are bent round the edges of the sheet 40 so as to prevent any significant magnetic flux from reaching the sheet 40 from the primary core portions 10 without first passing through the sheet 38. This expedient allows the overall width of the secondary member of the machine shown in FIG. 3 to be less than that of the machine shown in FIG. 2.

In the embodiment of the invention shown in FIGS. 1 to 3, the paths of the magnetic flux have been entirely in planes transverse to the direction of travel. A so-called hybrid flux machine in accordance with the invention, in which some of the flux follows longitudinal paths, is illustrated in FIG. 4. This machine bears the same relationship to the transverse flux machines of FIGS. 1 to 3 as the hybrid flux linear induction motors described in U.S. Pat. No. Re. 28,161 bear to the corresponding transverse flux linear induction motors described in U.S. Pat. No. Re. 28,161. In FIG. 4, the secondary member is substantially the same as that of the machine illustrated in FIG. 2, consisting of a sheet 50 of non-magnetic electrically conductive material backed by a rather narrower sheet 52 of magnetic material. The primary core 54 consists of two stacks of mutually insulated longitudinally oriented magnetic laminations 56 and 58, each of which extends continuously along the full length of the primary member, and a stack of transversely oriented U-shaped laminations 60 backing the stacks 56 and 58 of longitudinal laminations and having their side arms extending downwardly to form rows of pole faces 62 and 64 co-planar with the pole faces 68 and 70 formed by the stacks 56 and 58.

The stacks 56 and 58 of longitudinal laminations are slotted to receive winding conductors 70 and 72 which form a two or more layer plural phase distributed winding of the kind which is well known in the linear induction motor art. The depth of the longitudinal laminations above the slots is just that sufficient to give the necessary mechanical strength to the longitudinal stacks 56 and 58. This generally results in saturation at a low level of flux in the teeth 56 and 58, so that the reluctance of the longitudinal flux paths within the stacks 56 and 58 is substantially higher than the transverse flux paths formed by the stacks 56 and 58 in conjunction with the stack 54.

In cases where the pole pitch is comparable to the pole width, i.e. the poles are nearly "square", there may be advantage in increasing the depth of the core of the longitudinal laminations in order to allow flux to pass both longitudinally and transversely, thus reducing the overall magnetising current. This embodiment represents the transition between the conventional longitudinal flux type of linear motor and the transverse flux type. Even in high speed motors whose pitch is very much greater than the width, some degree of two-dimensional flux patterns will occur if the secondary steel is not laminated, and if longitudinal flux exists it can only be beneficial.

Hybrid flux primary members possess the advantages over transverse flux primary members that structural members which do not contribute to the magnetic circuit are not required, thereby saving weight, and that the longitudinal flux paths are operative to cause the currents in the sheet 50 to flow in the parts thereof where they are most effective to produce propulsive force. These and other advantages are more fully explained in the above mentioned U.S. Pat. No. 3,770,995.

The machine of FIG. 4 is shown with the primary member supported above the secondary member by electromagnetic levitation due to the magnetomotive force produced by the primary member. In any of the embodiments, either the primary member may be supported above the secondary member or the secondary member above the primary member but, generally, the primary member will be substantially shorter than the secondary member. In a tracked transport system, the lower member would constitute the track and the upper member would form part of a vehicle.

In any of the embodiments shown in FIGS. 2, 3 and 4, the magnetic material of the secondary may consist of a stack of vertical transversely orientated laminations instead of being a continuous sheet.

We claim:

1. A primary member for a linear induction machine comprising a core of magnetic material and energising windings on said core, said core comprising longitudinally spaced sets of four laterally adjacent co-planar pole faces and means arranged to provide paths for working flux between each pole face and all three other pole faces in the same set, said paths being disposed in transverse planes substantially perpendicular to the plane containing said pole faces, each set of four laterally adjacent pole faces being formed on the ends of four limbs of a respective core portion, the core portion also including a backing part interconnecting the ends of the limbs remote from the pole faces, the energising windings being disposed only on the inner two limbs of each set of four laterally adjacent limbs.

2. A primary member as claimed in claim 1, in which each core portion comprises a stack of laminations disposed parallel to the planes containing the paths for working flux, each lamination having four mutually parallel limbs.

3. A primary member as claimed in claim 1, in which the core comprises a stack of U-shaped laminations, each disposed parallel to the planes containing the paths for working flux, the limbs thereof having the two outer pole faces of each set on the end thereof, and two intermediate stacks of longitudinally extending laminations, disposed between the limbs of the U-shaped stack, each intermediate stack having a respective one of the two inner pole faces of each set formed thereon and having slots to accommodate the windings.

4. An electrical machine having a primary member comprising a core of magnetic material and energising windings on said core, said core comprising longitudinally spaced sets of four laterally adjacent co-planar pole faces and means arranged to provide paths for working flux between each pole face and all three other pole faces in the same set, said paths being disposed in transverse planes substantially perpendicular to the plane containing said pole faces, and a secondary member comprising electrically conductive material disposed so that the pole faces confront one side thereof with a single air gap therebetween, the secondary member being arranged to provide longitudinal paths for electric current on each side of at least the inner pole faces of each set and transverse paths for electric current interconnecting the longitudinal paths, whereby, when the windings of the primary member are energised from an alternating current supply, the resulting field of magnetomotive force is operative to produce a thrust having first components tending to vary the separation between said primary member and said secondary member and second components tending to maintain said primary member and said secondary member in lateral alignment with one another.

5. An electrical machine as claimed in claim 4, in which the secondary member comprises a sheet of electrically conductive non-magnetic material and magnetic material disposed on the side of the sheet of electrically conductive non-magnetic material remote from the primary member, whereby magnetic flux from the primary member passes through the electrically conductive material before reaching the secondary magnetic material.

6. An electrical machine as claimed in claim 5, in which the electrically conductive non-magnetic material of the secondary member is at least as wide as the core of the primary member and the magnetic material of the secondary member is narrower than the electrically conductive non-magnetic material thereof.

7. An electrical machine as claimed in claim 4, in which the energising windings are plural phase windings whereby, when the windings are energised from a plural phase alternating current supply, the resulting field of magnetomotive force travels longitudinally so that the thrust between the primary member and the secondary member includes additional components tending to cause relative longitudinal displacement therebetween.

* * * * *